(12) United States Patent
Vesikar et al.

(10) Patent No.: US 11,443,512 B1
(45) Date of Patent: Sep. 13, 2022

(54) SYSTEMS AND METHODS FOR QUERYING VIDEO INFORMATION OF ELECTRONIC GAMES

(71) Applicant: Microsoft Technology Licensing, LLC, Redmond, WA (US)

(72) Inventors: Yash Vesikar, Farmington Hills, MI (US); Varun Varshney, Seattle, WA (US); Donald Frank Brinkman, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/246,050

(22) Filed: Apr. 30, 2021

(51) Int. Cl.
| | | |
|---|---|---|
| *H04N 9/80* | (2006.01) | |
| *G06V 20/40* | (2022.01) | |
| *G06N 20/00* | (2019.01) | |
| *G06F 16/783* | (2019.01) | |
| *G06K 9/62* | (2022.01) | |
| *G06F 16/78* | (2019.01) | |
| *H04N 5/93* | (2006.01) | |

(52) U.S. Cl.
CPC .......... *G06V 20/41* (2022.01); *G06F 16/7834* (2019.01); *G06F 16/7837* (2019.01); *G06F 16/7867* (2019.01); *G06K 9/6256* (2013.01); *G06N 20/00* (2019.01); *G06V 20/46* (2022.01); *G06V 20/44* (2022.01)

(58) Field of Classification Search
CPC ........ G06V 20/41; G06V 20/46; G06V 20/44; G06N 20/00; G06F 16/7837; G06F 16/7834; G06F 16/7867; G06K 9/6256
USPC ................................ 386/241, 278, 248, 281
See application file for complete search history.

(56) References Cited

U.S. PATENT DOCUMENTS

2017/0106283 A1* 4/2017 Malyuk ................... A63F 13/49

FOREIGN PATENT DOCUMENTS

| | | | |
|---|---|---|---|
| AU | 2013226573 A1 | * | 9/2014 |
| CN | 113632061 A | * | 11/2021 |

* cited by examiner

*Primary Examiner* — Robert Chevalier
(74) *Attorney, Agent, or Firm* — Ray Quinney & Nebeker P.C.; John O. Carpenter

(57) ABSTRACT

A method of presenting video information to a user includes, at a server computer, obtaining video information including a plurality of frame from a real-time video stream of an electronic game and obtaining ML model data. The method includes determining a presence of at least one event in the video information using a ML model and the ML model data to identify the at least one event. Upon receiving a query from a user for the presence of the at least on event in the video information, the method includes denoting a presence of the at least one event in the video information associated with at least one frame of the plurality of frames of the video information and presenting to the user a visual representation of the at least one frame of the plurality of frames of the video information associated with the at least one event.

20 Claims, 5 Drawing Sheets

SYSTEMS AND METHODS FOR QUERYING VIDEO INFORMATION OF ELECTRONIC GAMES

BACKGROUND

Background and Relevant Art

Electronic games can be recorded and edited for later viewing. The recorded and/or edited videos may be viewed for entertainment, education, training, coaching, or commentary. Some videos are edited for entertainment purposes and distributed on various websites. eSports, in particular, can produce many hours of competitive play that can be valuable to review or access at a later time for individual players to improve their skills and for coaches or players to prepare a strategy for other players or teams.

BRIEF SUMMARY

Electronic games are played competitively and recreationally both online and offline. In some embodiments, a system or method according to the present disclosure provides for a more efficient querying and editing process for users based on objects and elements identified in the video information. After objects and elements are identified, a user may query the system to quickly access the portions of the video information containing the objects or elements. In some embodiments, the objects and elements are identified by a machine learning (ML) model or system that is configured for classification or identification of game events such as user interface elements, user interface animations or actions, user avatar appearance, user avatar animations or actions, game environment objects, game environment animations or actions, or other visual elements rendered by the game application for presentation to a user. In some embodiments, the video information can further include audio information, allowing for additional identification or classification of game events by audio cues. Audio cues may be used for identification of off-screen events.

In some embodiments, a method of presenting video information to a user includes, at a server computer, obtaining video information including a plurality of frame from a real-time video stream of an electronic game and obtaining ML model data. The method includes determining a presence of at least one event in the video information using a ML model and the ML model data to identify the at least one event. Upon receiving a query from a user for the presence of the at least on event in the video information, the method includes denoting a presence of the at least one event in the video information associated with at least one frame of the plurality of frames of the video information and presenting to the user a visual representation of the at least one frame of the plurality of frames of the video information associated with the at least one event.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
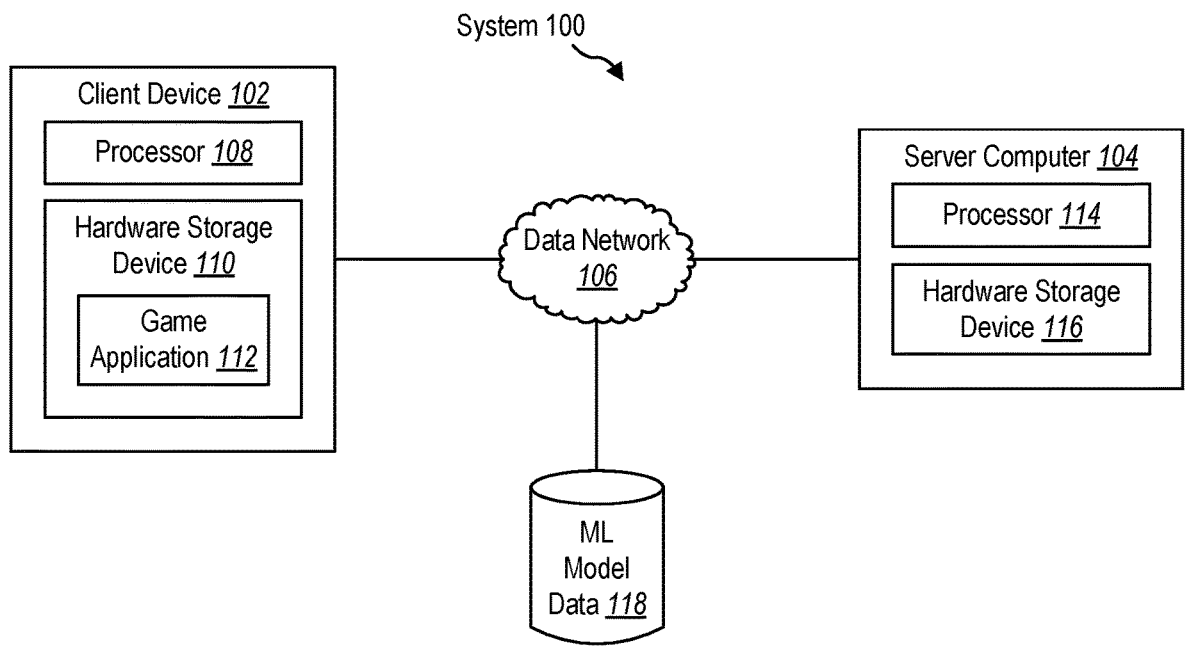
FIG. 1 is a schematic representation of a system for presenting video information from an electronic game to a user, according to at least some embodiments of the present disclosure.

The present disclosure relates generally to systems and methods for providing interaction with video information produced by a game application. Systems and methods described herein provide automatic detection and identification of objects and elements in gameplay video information in electronic gaming. In some examples, a streaming content creator, a speedrunner, or a competitive player may play and record many hours of gameplay per day. In some embodiments of systems and methods according to the present disclosure, video information is evaluated to detect objects and events using machine vision. In some embodiments, a machine learning (ML) system evaluates the video information with the machine vision system in addition to evaluating associated audio information, game state data, user inputs, or combinations thereof to detect events. The detected objects and events are then identified and/or classified to allow querying and editing of the video information. In some embodiments, the detection and identification of events is assisted by the machine vision and/or machine learning (ML) system invoking an application module.

In some embodiments, the application module is created by a machine learning system through training datasets. For example, a machine learning system may evaluate many events to determine correlations between events across many video streams or recordings. In some embodiments, the application module is a predetermined application module based on the game engine of the game application to inform the system what events, objects, or animations are rendered in the game engine. For example, the application module may provide an example user avatar model, object textures, weapon models, health pack models, victory animations, etc.

The application module may be specific to the game application, as the art style, animation style, or textures used in a first game application can be very different from a different game application. Furthermore, storing all possible textures, models, animations, and events for a plurality of game applications in memory and searching for those objects and events in the video information may be inefficient, when the video information may only include video information from a single game application at a time. In at least one example, a competitive electronic game player may practice the electronic game League of Legends for 8-10 hours in a day, while recording the video information from the practice session. It is more efficient to invoke an application module for League of Legends, specifically, when evaluating and querying the video information later, as compared to attempting to detect and identify objects and events using machine vision data also including textures, models, animations, and events encompassing other games such as Fortnite, Super Smash Bros., Street Fighter, and Forza Motorsport.

In some embodiments, the application module may include or assist a machine vision system in identifying graphical textures in the video information provided from the client device. In some embodiments, the application module includes game characteristics specific to the game application being run by the client device. In some embodiments, the game characteristics include textures, models, animations, UI elements, sounds, or other visual or audible features from the game. For example, the application module may include texture files that provide a unique texture that is used in the game to skin a particular item in the game environment. In at least one example, a boss character at the end of a level in the game environment may have a unique appearance in the game, and the machine vision system may access the application module to identify the character or event based on the texture used to skin the model. In some examples, a level or area of the game environment may include a unique texture or combination of textures on surfaces in the game environment. For example, a particular castle level may use a unique texture for the stone walls of the castle, allowing the machine vision system to identify portions of the video information when the playing user is within that portion of the game environment.

In some embodiments, the application module includes a model or sprite that is used in the game environment to depict a particular character or class of characters. The application module can include both volumetric models used to depict a three-dimensional avatar or object in the game environment, a three-dimensional skeleton model used to provide proportions over which a volumetric model is positioned and animated, two-dimensional sprites or skeletons, or combinations thereof. The models can allow the machine vision system to more readily detect and/or identify objects and avatars in the video information depicting the game environment.

In some embodiments, the application module includes animation information allows the machine vision system to identify common movements in the video information depicting the game environment. For example, some games allow customization of user avatars, which allow each user avatar to include different textures, sizes, proportions, or other variations to their appearance in the game environment. Some animations, such as emotes, attacks, or jump animations may produce similar movements of objects or portions of the avatar relative to one another. In at least one example, Fortnite includes a variety of dance animations that, while performable by avatars using different sizes, proportions, colors, textures, models, equipable cosmetic objects, or even representing species, move the avatars' limbs relative to the body in the same manner. The resulting animation may be recognized by the machine vision system independently of the model or textures used to represent the animation in the video information depicting the game environment.

User interface (UI) elements are present on the video information independently of the objects, perspective, or actions occurring in the game environment. In some embodiments, the application module includes UI elements that the machine vision system uses to interpret information provided by the UI to the user. For example, the UI elements can provide various information about the status of the game or game environment, such as user avatar information, game time information, team information, score, health, mana, lives, eliminations, equipment, powerups, abilities, cooldowns, etc. The UI elements can allow the machine vision to identify different stages or sections of a gameplay session in the video information.

In some embodiments, a ML model or system communicating with the machine vision system can interpret the detected textures, models, animations, or combinations thereof as various events in a gameplay session to be surfaced to a viewer of the video information. For example, an enemy elimination event may be detected by a UI element incrementing, by an elimination animation detected in the user avatar, an elimination animation detected in an opposing avatar, by a splash screen or UI banner element announcing the elimination, or by other visual cues. The detection of at least one of the foregoing may allow the system to identify the event as an elimination event.

Some embodiments of systems and methods according to the present disclosure may access the application module to identify key events in the video information depicting a game environment and/or a gameplay session to be surfaced to a viewer of the video information. In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience.

While some embodiments of systems and methods for present video information to a user evaluate only video information, some embodiments evaluate other forms of information or data to supplement the video information. In some embodiments, the video information obtained from a client device further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information obtained from the client device includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, a ML system may allow for the development of an application module for unknown game applications and/or the refinement of application modules for known game applications. For example, while an application module may be provided for a game application with a broad install base, some game applications may have a smaller install base and the creation of a dedicated or predetermined application module may not be desirable. In some embodiments, an existing application module may be refined over time using a ML model to update the application module or other ML model data with new strategies, new movesets, new characters, new stages, new items, or newly popularized techniques and strategies. For example, updates to existing game applications may utilize existing application modules for the UI elements, textures, models, and animations, along with existing key events, popular events, rare events, or combinations thereof while adding new content. The ML model allows the new content to be identified as new UI elements, textures, models, and animations. Upon detecting the new UI elements, textures, models, and animations repeatedly, the ML model may reclassify the detected new UI elements, textures, models, and animations as key events, popular events, rare events, etc. as those elements are detected more frequently and in particular contexts in the video information depicting the game environment.

Generally, systems and methods according to the present disclosure can classify and/or tag portions of the video information based on the presence and/or proximity of the detected and identified elements. In some embodiments, the key events are associated with tags that identify them as key events and associate the key event with any number of contextual tags. For example, an elimination banner in the UI may be detected by the machine vision and/or ML model of the system and identified as a key event. The key event is also assigned tags indicating that the key event is an opponent elimination, was performed with a sniper rifle, was performed while scoped, and was performed at 10 minutes and 31 seconds into the match.

In some embodiments, the tag is associated with a time stamp in the video information timeline. The timeline of the video information may or may not correspond to the match timeline or gameplay session timeline. For example, video information obtained by systems and methods according to the present disclosure may include video information (and, optionally, audio information and/or user inputs) from before, between, or after gameplay sessions. In a particular embodiment, the video information includes video of a streaming electronic game player talking to spectators before a gameplay session begins, a first gameplay session, a lobby between gameplay sessions, a second gameplay session, and video of the streaming electronic game player talking to the spectators after the second gameplay session. In such an example, a key events tagged as occurring in the first 5 minutes of a gameplay session may occur during the first gameplay session, from approximately 7 minutes to 12 minutes on the video information timeline, and during the second gameplay session, from approximately 21 minutes to 26 minutes on the video information timeline. The timestamps for key events tagged as occurring in the first 5 minutes of a gameplay session may be timestamped between 7:00 and 12:00 and between 21:00 and 26:00 relative to the video information timeline.

In some embodiments, timestamping and reporting the identified events to a viewer includes presenting a visual indicator on the video information timeline. In some embodiments, systems and methods according to the present disclosure include amending the metadata of the video information to include tags for events in the video information. In some embodiments, the metadata of the video information file is amended. In some embodiments, the metadata of individual frames of the video information is amended. In some embodiments, a system or method according to the present disclosure creates a separate file with tag information for the video information file.

In some embodiments, a visual representation or indicator may be applied to the video information timeline to visually represent the location of events in the video information. In some embodiments, a dot, line, dash, or other symbol may be presented at the position in the timeline for events meeting selected tags. In at least one example, key events, popular events, and rare events have different symbols associated with each at visual indicators on the timeline. In at least another example, a user may query or select certain tags such as opponent eliminations or round wins, and symbols may be applied to only locations on the video information timeline associated with events with those tags.

In some embodiments, a system for presenting electronic gaming video information to a user includes a client device and a server computer in communication via a data network. the system 100 includes a client device 102 and a server computer 104 in communication via a data network 106. In some embodiments, the client device 102 is a computing device with a processor 108 and hardware storage device 110 in communication with the processor 108. In some embodiments, the hardware storage device 110 is any non-transient computer readable medium that may store instructions thereon. The hardware storage device 110 may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device 110 is local to and/or integrated with the client device 102. In some embodiments, the hardware storage device 110 is accessed by the client device 102 through a network connection.

The processor 108 may execute a game application 112 that is stored on the hardware storage device 110 to render video information at least partially in response to user inputs to the client device 102. In some embodiments, the client device 102 includes a display device to display the video information to a playing user. For example, the client device 102 may be a dedicated gaming console with an integrated display (e.g., NINTENDO SWITCH) or a general-purpose computer with an integrated display (e.g., a laptop computer). In some embodiments, the client device 102 is in communication with a display device to display the video information to a playing user. For example, the client device 102 may be a gaming console (e.g., MICROSOFT XBOX) that outputs the video information to a connected display device (e.g., a television) for display to a playing user.

In some embodiments, the video information or a portion of the video information is also transmitted to a server computer 104 via a data network 106. In some embodiments, the server computer 104 is located remotely from the client device 102 and the data network 106 is or includes the World Wide Web. For example, the client device 102 may be connected to the data network 106 via the playing user's home internet connection, and the server computer 104 may be located in a datacenter. In some embodiments, the server computer 104 is located locally to the client device 102 and the video information is transmitted over a local area network or a direct data connection. For example, a competitive electronic game tournament (e.g., an eSports competition) may have a local data network 106 to which all client devices 102 used for the competition are connected. A server computer 106 connected to the local data network 106 may communicate with the client devices 102 used for the competition.

In some embodiments, the server computer 104 receives the video information from the client device 102 via the data network 106. The server computer 104 includes a processor 114 and a hardware storage device 116 in data communication with the processor 114. The hardware storage device 116 has instructions stored thereon that, when executed by the processor 114, cause the server computer 104 to perform any of the methods described herein. For example, the server computer 104 may detect events in the video information to classify different events based on identified textures, models, animations, or other criteria.

In at least one embodiment, the server computer 104 includes or is in communication with a machine learning (ML) model that detects and/or reports events in the video information to evaluate the video information and identify and tag events. In some embodiments, the server computer 104 has stored thereon (e.g., in the hardware storage device 116) a ML model that accesses and/or communicates with ML model data 118. In some examples, the ML model data is stored locally to the server computer. In some examples, the ML model data 118 is stored remotely from the server computer 104 and accessed by the server computer via the data network 106. For example, the ML model data 118 may be aggregated from and/or refined by a plurality of ML models executed by a plurality of server computers. The ML model data may be updated based on the outputs of the ML models, with the most current ML model data made available for the ML model running on the server computer 104 when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, a UI element indicating player avatar health may increase in value in response to the player avatar interacting with a health pack in the game environment.

In some embodiments, the ML system can create an application module of expected or correlated events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games including Rocket League or FIFA). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined. In some embodiments, the application module is developed and refined by the ML system by iterations of processing video information.

Figure 2:
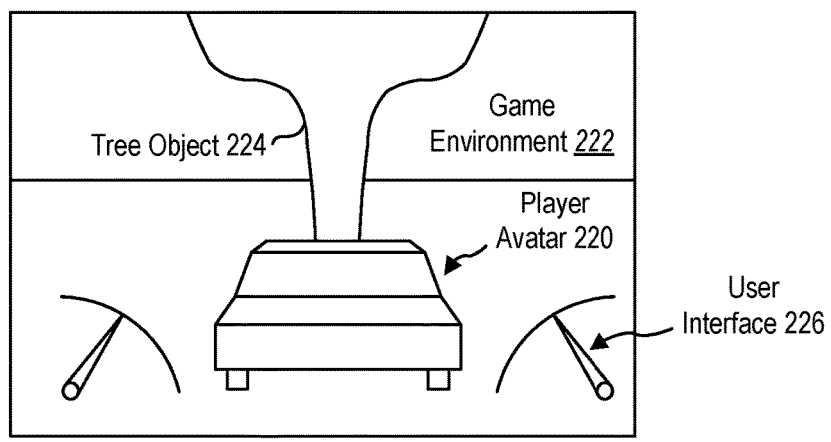
FIG. 2 is a frame of video information used to identify an event in video information of an electronic game, according to at least some embodiments of the present disclosure.

Systems and methods according to the present disclosure parse the video information by detecting objects in frames of the video information. In some embodiments, the objects include virtual objects positioned in the game environment such as illustrated in FIG. 2. The video information may reflect the player avatar 220, such as a car, moving within a three-dimensional or two-dimensional game environment 222, where the position of the virtual object 224 is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar 220 relative to the overall game environment 222 and/or depending on the movement of the virtual object 224 relative to the game environment 222.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In FIG. 2, a frame of video information includes an object 224 (e.g., a tree) positioned in the game environment 222 with the player avatar 220, in this case a car. Other objects in the frame include the user interface 226 which may be independent of the three-dimensional game environment

222. The machine vision may identify the position, size, and shape of the tree object 224 relative to the player avatar 220 to determine relative position of the object 224 and the avatar 220 in the game environment 222. By evaluating the relative position of the object 224 and the avatar 220 in one frame or a sequence of frames (adjacent frames at the native framerate or non-adjacent key frames), the machine vision and/or ML system may identify a crash between the car and the tree. The crash may be identified as a key event and denoted as such relative to the timeline of the video information.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI 226. In other examples, a detected object that increases in size differently than the other objects in the game environment may be moving relative to the game environment. In the illustrated embodiment in FIG. 2, a crash key event may be identified by a change in the UI 226 depicting the speedometer rapidly and/or suddenly decreasing in value. For example, a rapid change in the UI 226 reflecting a change in speed of the car avatar 220 from 150 kilometers per hour (kph) to 0 kph in under 1.0 seconds may be identified as a crash.

A virtual object, as used herein, may include any object or element rendered or presented by the client device in the process of running the game application. For example, a virtual object may be an element of the UI 226. In some examples, a virtual object may be a player avatar 220. In some examples, the virtual object may be wall, floor, or other geometry of the game environment 222 such as a tree object 224. In some examples, the virtual object may be an interactive or movable object within the game environment, such as a door, crate, or power-up.

In some embodiments, the machine vision and/or ML model can identify objects in the game environment 222 without explicit training to identify the object. For example, a machine vision system that includes ML may learn to identify tree objects 224 within the game environment 222, even if the particular model of tree object 224 has not been explicitly taught to the machine vision system. In at least one example, systems and methods according to the present disclosure may be portable between video information from a variety of game applications where different models for common objects, such as tree object 224, are used. By training the ML model, the machine vision may be able to recognize and detect tree object 224 in the video information. In some examples, elements of the game environment are procedurally generated. A series of procedurally generated tree objects 224 may include common elements but be distinct models from one another, as rendered in the video information. Therefore, an explicitly provided model would be inapplicable to procedurally generated tree objects 224.

In some embodiments, the machine vision system invokes an application module that is associated with the game application that is the source of the video information. Art styles can vary considerably between game applications. Even a ML model that has been trained on video information from a plurality of game applications to detect tree objects 224 may fail when presented with a new art style. For example, while both Fortnite and Call of Duty are competitive first-person shooter games, the appearance of objects is very different between the games. Specifically, tree objects 224 and other elements of the game environment 222 appear very different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

Figure 3:
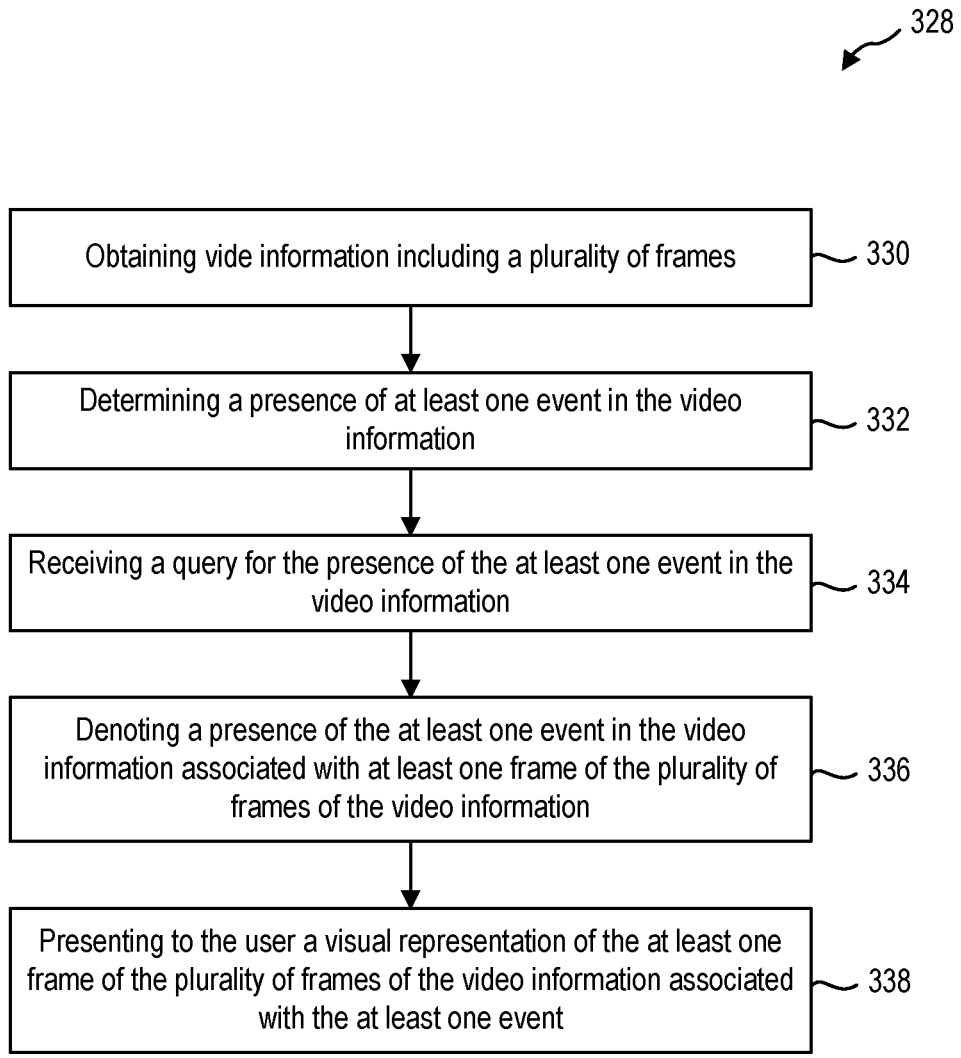
FIG. 3 is a flowchart illustrating a method of presenting video information from an electronic game to a user, according to at least some embodiments of the present disclosure.

FIG. 3 is a flowchart illustrating an embodiment of a method 328 of presenting electronic game video information performed at a server computer (e.g., server computer 104 of FIG. 1). The method 328 includes obtaining video information including a plurality of frames 330. In some embodiments, the method 328 can be performed on any source of video information from a game application (e.g., game application 112 of FIG. 1), such as gameplay recordings, recreated renderings of a gameplay session based on game state data, or from live streams of the gameplay. For example, obtaining the video information may include obtaining the video information in real-time as the video information is generated by the processor(s) of the client device. In some examples, obtaining the video information includes accessing a recording of the video information that was generated by the processor(s) of the client device after the fact, such as from archived recordings.

The method 328 includes evaluating at least one frame of the plurality of frames of the video information at to identify a virtual object, texture, model, or animation. After identifying the virtual object, texture, model, or animation in the frame, the method includes determining a presence of at least one event associated with the detected element at 332.

The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

In some embodiments, the determining the presence of at least on event in the video information includes comparing the detected object, texture, model, or animation to one or more events of an application module. As described herein, the application module may be predetermined or may be generated by a ML system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold.

While some embodiments of systems and methods for presenting video information to a user evaluate only video information, some embodiments evaluate other forms of information or data to supplement the video information. In some embodiments, the video information obtained from a client device further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information obtained from the client device includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

The method further includes receiving a query from a user for the presence of the event in the video information at 334. In some embodiments, the query may include a single parameter. In some embodiments, the query includes a plurality of parameters. In some embodiments, the application module includes query terms associated with one or more events or tags. In some embodiments, the query includes a plurality of parameters. Various parameters may include the event type (e.g., key event, popular event, rare event, etc.); time or time range within the video information or within a game round (e.g., within 10 minutes of the end of the video or within the first 5 minutes of the start of the second round); virtual objects interacted with (e.g., picked up a crate), other avatars interacted within (eliminated or eliminated by a specific other player avatar), abilities used (e.g., offensive spells, defensive spells), avatar state or properties (e.g., Health level, mana level, ammunition, equipped items, applied status buffs or debuffs), gameplay mode, etc. Below is an example of a query invoking an application module for Fortnite and requesting any events including an opponent elimination with a sniper rifle within the first ten minutes of the game time (which may be independent of the temporal location of the event in the video information timeline):

where ai.game=="Fortnite"
where ai.eliminations>0
where ai.weapon=='sniper' and ai.gameTime<ago (10 m)

In some embodiments, the video information is evaluated, and a plurality of events are identified and indexed in the video information metadata or in a separate timestamp file, prior to receiving the query from a user. In some embodiments, the query prompts the evaluation of the video information for the related event.

In some embodiments, at least one event is identified in the video information, and the presence of the at least one event is denoted to associate the event with at least one frame of the video information at 336. In some embodiments, denoting the presence of the event includes amending the metadata of the video information file with a timestamp to temporal location of the frame. For example, the metadata of the video information file may include a timestamp with tags to identify the type of event and any additional tags with additional information or event subtypes. The metadata of the video information file may be readable by a video editing software or video viewing software to visualize the timestamps of the events as locations on a timeline of the video information. In some embodiments, the metadata is searchable to search the list of timestamps for the particular tags or for any tags that are within a given value, such as timestamps between 5:00 and 8:00 in the match timeline.

In some embodiments, denoting the presence of the event includes amending the metadata of an individual frame of the video information file with tags. For example, the metadata of individual frames of the video information file may include tags to identify the type of event and any additional tags with additional information or event subtypes. Amending the metadata of individual frames may inherently associate the tags with a position on a timeline of the video information, as each frame has a temporal location in the video information. The metadata of the individual frames of the video information file may be readable by a video editing software or video viewing software to visualize the timestamps of the events as locations on a timeline of the video information. In some embodiments, the metadata is searchable to search for the particular tags or for any tags that are within a given value.

In some embodiments, denoting the presence of the event includes creating or amending a separate file with a list of timestamps or other mechanism to associate the contents of the separate file with the timeline of the video information. For example, the contents of the separate file may include a timestamp with tags to identify the type of event and any additional tags with additional information or event subtypes. The contents of the separate file may be readable by a video editing software or video viewing software in conjunction with the video information file to visualize the timestamps of the events as locations on a timeline of the video information. In some embodiments, the content of the separate file is searchable to search the list of timestamps for the particular tags or for any tags that are within a given value.

In some embodiments, at least one tag used to identify an event in the video information is associated with a single frame of the plurality of frames in the video information. In some embodiments, a tag is associated with a single frame to mark the frame at which an elimination occurs or the frame at which the match ends. In some embodiments, a tag is associated with a single frame to mark the beginning of an identified animation.

In some embodiments, at least one tag used to identify an event in the video information is associated with a plurality of sequential frames to represent a duration of the event in the video information. In some embodiments, a tag is associated with frames occurring from 5:15 to 5:32 in the video information to denote the duration of an active powerup. In some embodiments, a tag is associated with a duration during which opponents eliminations occur, which all contribute to the event of a multi-elimination banner is identified in the UI at the end of the duration. In a particular example, five opponent eliminations occur during an eight second duration between 5:20 and 5:28 in the video information. In some embodiments, each of the five opponent eliminations are identified as key events, with each key event being denoted as such. At 5:30, a UI banner indicating a Team Elimination is identified and denoted as a key event and a popular event. In response to identifying the Team Elimination at 5:30, the system may look back in the video information to identify the range from 5:20 to 5:30, during which the five opponent eliminations that contribute to the Team Elimination and the UI banner announcing Team Elimination all occur, may be further denoted as a popular event. The result is a queryable set of tags that allow a user to search for the timestamp for each opponent elimination, the timestamp for the Team Elimination UI banner, or for a video clip that contains the complete eight second event that produced the Team Elimination.

In some embodiments, a plurality of identified events within a preset temporal proximity to one another may be recorded or reported to the user as an event amplitude. For example, a particular point in the video information or a portion of the video information with a high density of events may indicate a particularly climatic moment or sequence in the video information. The high density of events may be of particular interest to a viewer or editor.

The method 328, in some embodiments, further includes presenting to the user a visual representation of the at least one frame of the plurality of frames of the video information associated with the at least one event at 338. In some embodiments, the visual representation or visual indicator is a dot, dash, shape, or symbol presented on a UI of the video information editing or viewing software, such as illustrated in FIG. 4.

A frame 440 of the video information is shown including a representation of the game environment 422 with the player avatar 420 visible holding a map object 424. The detection of a map object 424 in the possession of the player avatar 420 may indicate a building key event. In some embodiment, a UI element 426 (such as a map) may provide information and/or context to the event, such as the map providing a location in the game environment 422.

Figure 4:
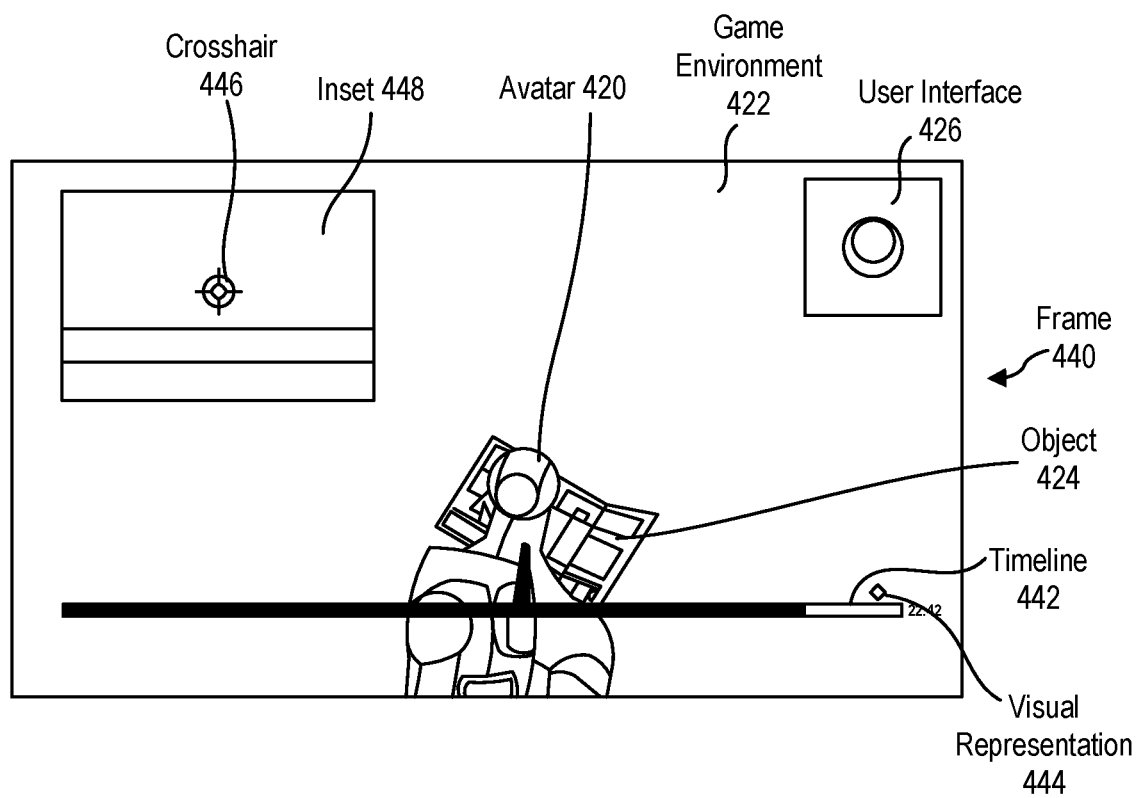
FIG. 4 is an illustration of a frame of video information with a video information timeline including visual representation of identified events in the video information, according to at least some embodiments of the present disclosure.

FIG. 4 illustrates the frame 440 presented to a user in a video information editing and/or viewing software application. A video information timeline 442 indicates the temporal location of the frame 440 within the video information. In some embodiments, one or more visual representations 444 of identified events are positioned on or near the timeline 442 to indicate to the user the temporal location of the events in the video information.

In some embodiments, the shape or symbol of the visual representation 444 representing the event on the video information timeline 442 may be unique to the type of event or tags associated with the event. For example, a dot may indicate a key event, a heart may indicate a popular event, and a diamond may indicate a rare event. In some examples, different key events may have different symbols or visual representations associate with the key events, such as an "X" symbol indicating a player elimination key event, a crosshair 446 indicating an opponent elimination event (in the inset 448 of FIG. 4), a cross indicating a healing key event, a checkered flag indicating a round end, etc.

In some embodiments, the visual representation is a table of contents or chapter list that allows a user to link to the associated temporal location in the video information. In some embodiments, each event in the list of timestamps has a symbol, text tag, or other visual representation associated with the event to present to the user easily differentiated and recognizable links to the events in the video information. In at least one embodiment, one or more events are automatically selected and surfaced to the user as high priority events. For example, a plurality of events in close temporal proximity may produce an event amplitude above a preset threshold and prompt the video information editing or video information viewing software to present the high amplitude series of events to the user. In other examples, the video information editing or video information viewing software may present to the user any popular events or rare events.

Figure 5:
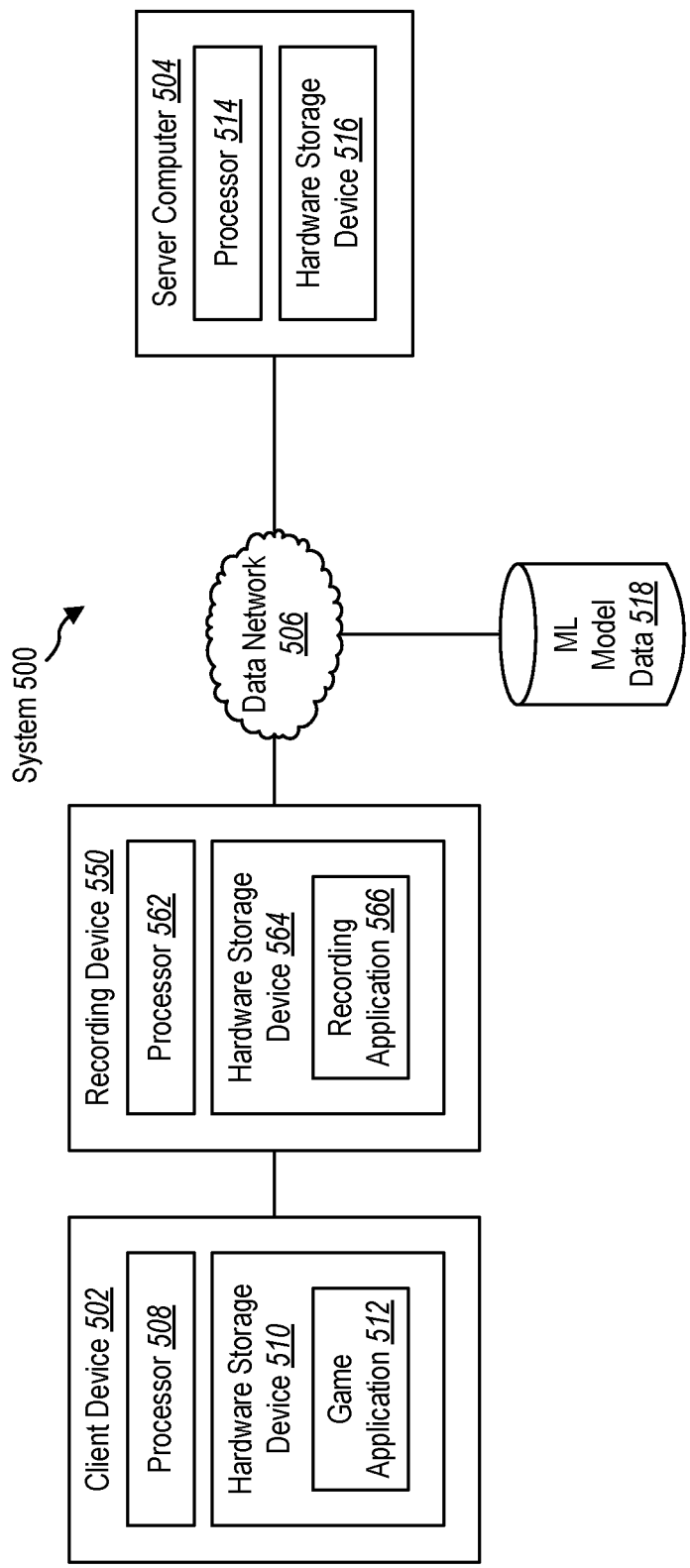
FIG. 5 is a schematic representation of another system for presenting video information from an electronic game to a user, according to at least some embodiments of the present disclosure.

In some embodiments, a method of presenting video information from an electronic game is performed at the client device or at a recording device local to the client device, which may subsequently be used to upload the video information and/or event information to a data network. While the embodiment of a method will be described in relation to a discrete recording device in data communication with the client device, it should be understood that some embodiments may be performed on the client device, itself. In at least one example, the client device is retail commodity hardware game console, and substantially all computational resources of the processor(s) are dedicated to the execution of the game application stored on the client device. As such, a recording device in communication with the client device may allow for additional computational resources local to the client device without compromising game performance FIG. 5 is a schematic illustration of a system 500 including a recording device 550 in communication with a client device 502 and a data network 506. A recording device 550, in some embodiments, includes a hardware storage device 564 in communication with at least one processor 562. The client device 502 provides video information (and, optionally, user input data and/or game state data) to the recording device 550. In some embodiments, the recording device 550 is connected to a data network 506 to communicate with or access a remote server computer 504 and/or ML model data 518.

The recording device 550 receives the video information from the client device 502 and evaluates the video information for events according to an application module. In some embodiments, the recording device 550 evaluates the video information according to any of the methods described herein.

Figure 6:
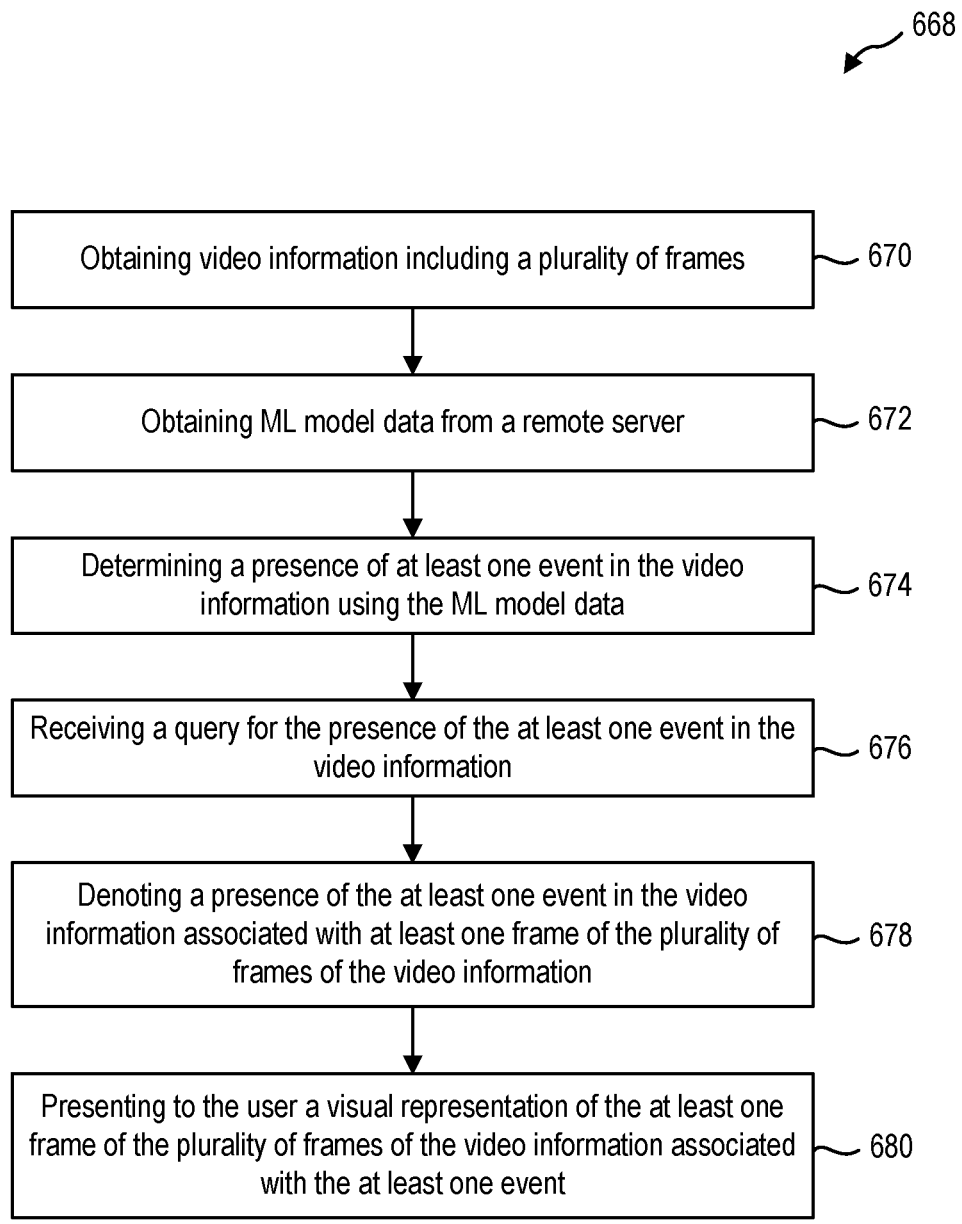
FIG. 6 is a flowchart illustrating another method of presenting video information from an electronic game to a user, according to at least some embodiments of the present disclosure.

In some embodiments, the recording device 550 or client device 502 obtains video information produced by execution of a game application 512 on the client device 502. In some embodiments, the video information is obtained by the client device 502 upon rendering the video information. In some embodiments, the video information is obtained by the recording device 550 by a local data connection to the client device 502. Referring now to FIG. 6, in some embodiments, the video information is obtained by the security device by a local data connection to the client device or by the client device at 670. The method 668 further includes obtaining ML model data from a remote server at 672 (such as the ML Model Data 518 of FIG. 5). The ML Model Data 518 may be aggregated from a plurality of ML models or from other client devices, recording devices, or server computers that have evaluated video information from the same or other game applications to refine or expand the ML Model Data 518. By obtaining ML Model Data from a network source, the client device or recording device local to the client device may benefit from the other ML models and computing devices evaluating video information.

A virtual object, texture, model, or animation may be detected by any of the methods or techniques described herein. For example, detecting the virtual object, texture, model, or animation and determining the presence of at least one event in the video information may include any of the machine vision and/or ML techniques described herein. In some embodiments, the method further includes comparing the detected virtual object, texture, model, or animation to one or more events of an application module based at least partially upon the ML model data to identify the event and determine the presence of the at least one event using the ML model data at 674.

In some embodiments, the application module is created by a machine learning system through training datasets. For example, a machine learning system may evaluate many events to determine correlations between events across many video streams or recordings. In some embodiments, the application module is predetermined based on the game engine of the game application to inform the system of various events, such as key events, popular events, rare events, or any other types of events and refined with the ML Model data.

The method 668 further includes receiving a query from a user for the presence of the event in the video information at 676. In some embodiments, the query may include a single parameter. In some embodiments, the query includes a plurality of parameters. Various parameters may include the event type (e.g., key event, popular event, rare event, etc.); time or time range within the video information or within a game round (e.g., within 10 minutes of the end of the video or within the first 5 minutes of the start of the second round); virtual objects interacted with (e.g., picked up a crate), other avatars interacted within (eliminated or eliminated by a specific other player avatar), abilities used (e.g., offensive spells, defensive spells), avatar state or properties (e.g., Health level, mana level, ammunition, equipped items, applied status buffs or debuffs), gameplay mode, etc. Below is an example of a query invoking an application module for Fortnite and requesting any events including an opponent elimination with a sniper rifle within the first ten minutes of the game time (which may be independent of the temporal location of the event in the video information timeline):

where ai.game=="Fortnite"
where ai.eliminations>0
where ai.weapon=='sniper' and ai.gameTime<ago (10 m)

In some embodiments, the video information is evaluated, and a plurality of events are identified and indexed in the video information metadata or in a separate timestamp file, prior to receiving the query from a user. In some embodiments, the query prompts the evaluation of the video information for the related event.

In some embodiments, at least one event is identified in the video information, and the presence of the at least one event is denoted to associate the event with at least one frame of the video information at 678. In some embodiments, denoting the presence of the event includes amending the metadata of the video information file with a timestamp to temporal location of the frame. For example, the metadata of the video information file may include a timestamp with tags to identify the type of event and any additional tags with additional information or event subtypes. The metadata of the video information file may be readable by a video editing software or video viewing software to visualize the timestamps of the events as locations on a timeline of the video information. In some embodiments, the metadata is searchable to search the list of timestamps for the particular tags or for any tags that are within a given value, such as timestamps between 5:00 and 8:00 in the match timeline.

In some embodiments, denoting the presence of the event includes amending the metadata of an individual frame of the video information file with tags. For example, the metadata of individual frames of the video information file may include tags to identify the type of event and any additional tags with additional information or event subtypes. Amending the metadata of individual frames may inherently associate the tags with a position on a timeline of the video information, as each frame has a temporal location in the video information. The metadata of the individual frames of the video information file may be readable by a video editing software or video viewing software to visualize the timestamps of the events as locations on a timeline of the video information. In some embodiments, the metadata is searchable to search for the particular tags or for any tags that are within a given value.

In some embodiments, denoting the presence of the event includes creating or amending a separate file with a list of timestamps or other mechanism to associate the contents of the separate file with the timeline of the video information. For example, the contents of the separate file may include a timestamp with tags to identify the type of event and any additional tags with additional information or event subtypes. The contents of the separate file may be readable by a video editing software or video viewing software in conjunction with the video information file to visualize the timestamps of the events as locations on a timeline of the video information. In some embodiments, the content of the separate file is searchable to search the list of timestamps for the particular tags or for any tags that are within a given value.

In some embodiments, at least one tag used to identify an event in the video information is associated with a single frame of the plurality of frames in the video information. In some embodiments, a tag is associated with a single frame to mark the frame at which an elimination occurs or the frame at which the match ends. In some embodiments, a tag is associated with a single frame to mark the beginning of an identified animation.

In some embodiments, at least one tag used to identify an event in the video information is associated with a plurality of sequential frames to represent a duration of the event in the video information. In some embodiments, a tag is associated with frames occurring from 5:15 to 5:32 in the video information to denote the duration of an active powerup. In some embodiments, a tag is associated with a duration during which opponents eliminations occur, which all contribute to the event of a multi-elimination banner is identified in the UI at the end of the duration. In a particular example, five opponent eliminations occur during an eight second duration between 5:20 and 5:28 in the video information. In some embodiments, each of the five opponent eliminations are identified as key events, with each key event being denoted as such. At 5:30, a UI banner indicating a Team Elimination is identified and denoted as a key event and a popular event. In response to identifying the Team Elimination at 5:30, the system may look back in the video information to identify the range from 5:20 to 5:30, during which the five opponent eliminations that contribute to the Team Elimination and the UI banner announcing Team Elimination all occur, may be further denoted as a popular event. The result is a queryable set of tags that allow a user to search for the timestamp for each opponent elimination, the timestamp for the Team Elimination UI banner, or for a video clip that contains the complete eight second event that produced the Team Elimination.

In some embodiments, a plurality of identified events within a preset temporal proximity to one another may be recorded or reported to the user as an event amplitude. For example, a particular point in the video information or a portion of the video information with a high density of events may indicate a particularly climatic moment or sequence in the video information. The high density of events may be of particular interest to a viewer or editor.

The method 668, in some embodiments, further includes presenting to the user a visual representation of the at least one frame of the plurality of frames of the video information associated with the at least one event at 680. In some embodiments, the visual representation or visual indicator is a dot, dash, shape, or symbol presented on a UI of the video information editing or viewing software, such as described in relation to FIG. 4.

In some embodiments, the method 668 optionally further includes generating one or more clips of the video information based on the identified events and/or the tags associated with the identified events. For example, the clip may include the frame in which an event is first identified, any subsequent consecutive frames in which the event is identified (e.g., the full duration of the event) and a predetermined number of frames or period of time before the first frame of the event and/or a predetermined number of frames or period of time after the final frame of the event. For example, if the event is five seconds in duration, the clip may include the three seconds immediately prior to the event, the five seconds of the event, and three seconds immediately after the event. The clip may be presented to the user as a selectable portion of a timeline, such as in the UI described in relation to FIG. 4 or the clip may be presented to the user as a standalone video file. The user may subsequently save, export, or share the clip via a network, such as via social media.

The social media metrics of the clip shared to social media (e.g., "likes", shares, comments, views, saves, or other social media engagement metrics may be reported to the ML model and/or ML model data to further refine ML model based on other user's reactions to the events with the associated tags. For example, a clip published to social media showing an elimination performed at very low resource levels in League of Legends may spur greater social engagement than a single elimination performed with high resource levels. The ML model may, therefore, refine and train over time to identify and/or highlight events which are correlated to high levels of social engagement on social media.

In some embodiments, a plurality of clips may be presented to the user as a standalone video file that includes a plurality of events from the video information. In some embodiments, the video file may be automatically generated based on the identified events and tags. In some embodiments, the video file may be automatically generated based on one or more queries received from the user or preset in the system. For example, the method may include evaluating the video information to identify any events including sniper rifle eliminations (such as described in the example described above), and the video file may be an automatically generated compilation of all sniper rifle eliminations identified in the video information. In some embodiments, the user may preset one or more parameters to automatically generate a "highlight reel" video file upon the evaluation of a video information. In at least one embodiment, the user may preset one or more parameters to automatically generate a "highlight reel" video file upon the termination of a live video stream. An electronic game streamer, therefor, is able to play the electronic game, broadcast the content in real-time during the gameplay, and, upon completion of the gameplay session and termination of the real-time video stream, have the system automatically create a highlight video file of the streaming session for the user to post online.

INDUSTRIAL APPLICABILITY

The present disclosure relates generally to systems and methods for allowing interaction with video information produced by a game application. Systems and methods described herein provide for automatic detection and identification of objects and elements in gameplay video information in electronic gaming. In some examples, a streaming content creator, a speedrunner, or a competitive player may play and record many hours of gameplay per day. In some embodiments of systems and methods according to the present disclosure, video information is evaluated to detect objects and events using machine vision. In some embodiments, a machine learning (ML) system evaluates the video information with the machine vision system in addition to evaluating associated audio information, game state data, user inputs, or combinations thereof to detect events. The detected objects and events are then identified and/or classified to allow querying and editing of the video information. In some embodiments, the detection and identification of events is assisted by the machine vision and/or machine learning (ML) system invoking an application module.

In some embodiments, the application module is created by a machine learning system through training datasets. For example, a machine learning system may evaluate many events to determine correlations between events across many video streams or recordings. In some embodiments, the application module is a predetermined application module based on the game engine of the game application to inform the system what events, objects, or animations are rendered in the game engine. For example, the application module may provide an example user avatar model, object textures, weapon models, health pack models, victory animations, etc.

The application module may be specific to the game application, as the art style, animation style, or textures used in a first game application can be very different from a different game application. Furthermore, storing all possible textures, models, animations, and events for a plurality of game applications in memory and searching for those objects and events in the video information may be inefficient, when the video information may only include video information from a single game application at a time. In at least one example, a competitive electronic game player may practice League of Legends for 8-10 hours in a day, while recording the video information from the practice session. It is more efficient to invoke an application module for League of Legends, specifically, when evaluating and querying the video information later, as compared to attempting to detect and identify objects and events using machine vision data also including textures, models, animations, and events encompassing other games such as Fortnite, Super Smash Bros., Street Fighter, Forza Motorsport, and other game applications.

In some embodiments, the application module may include or assist a machine vision system in identifying graphical textures in the video information provided from the client device. In some embodiments, the application module includes game characteristics specific to the game application being run by the client device. In some embodiments, the game characteristics include textures, models, animations, UI elements, sounds, or other visual or audible features from the game. For example, the application module may include texture files that provide a unique texture that is used in the game to skin a particular item in the game environment. In at least one example, a boss character at the end of a level in the game environment may have a unique appearance in the game, and the machine vision system may access the application module to identify the character or event based on the texture used to skin the model. In some examples, a level or area of the game environment may include a unique texture or combination of textures on surfaces in the game environment. A particular castle level may use a unique texture for the stone walls of the castle, allowing the machine vision system to identify portions of the video information when the playing user is within that portion of the game environment.

In some embodiments, the application module includes game characteristics including game assets, such as a model or sprite that is used in the game environment to depict a particular character or class of characters. The application module can include both volumetric models used to depict a three-dimensional avatar or object in the game environment, a three-dimensional skeleton model used to provide proportions over which a volumetric model is positioned and animated, two-dimensional sprites or skeletons, or combinations thereof. The models can allow the machine vision system to more readily detect and/or identify objects and avatars in the video information depicting the game environment.

In some embodiments, the application module includes animation information allows the machine vision system to identify common movements in the video information depicting the game environment. For example, some games allow customization of user avatars, which allow each user avatar to include different textures, sizes, proportions, or other variations to their appearance in the game environment. Some animations, such as emotes, attacks, or jump animations may produce similar movements of objects or portions of the avatar relative to one another. In at least one example, Fortnite includes a variety of dance animations that, while performable by avatars using different sizes, proportions, colors, textures, models, equipable cosmetic objects, or even representing species, move the avatars' limbs relative to the body in the same manner. The resulting animation may be recognized by the machine vision system independently of the model or textures used to represent the animation in the video information depicting the game environment.

User interface (UI) elements are present on the video information independently of the objects, perspective, or actions occurring in the game environment. In some embodiments, the application module includes UI elements that the machine vision system uses to interpret information provided by the UI to the user. For example, the UI elements can provide various information about the status of the game or game environment, such as user avatar information, game time information, team information, score, health, mana, lives, eliminations, equipment, powerups, abilities, cooldowns, etc. The UI elements can allow the machine vision to identify different stages or sections of a gameplay session in the video information.

In some embodiments, a ML model or system communicating with the machine vision system can interpret the detected textures, models, animations, or combinations thereof as various events in a gameplay session to be surfaced to a viewer of the video information. For example, an enemy elimination event may be detected by a UI element incrementing, by an elimination animation detected in the user avatar, an elimination animation detected in an opposing avatar, by a splash screen or UI banner element announcing the elimination, or by other visual cues. The detection of at least one of the foregoing may allow the system to identify the event as an elimination event.

Some embodiments of systems and methods according to the present disclosure may access the application module to identify key events in the video information depicting a game environment and/or a gameplay session to be surfaced to a viewer of the video information. In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity. In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience.

While some embodiments of systems and methods for present video information to a user evaluate only video information, some embodiments evaluate other forms of information or data to supplement the video information. In some embodiments, the video information obtained from a client device further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information obtained from the client device includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

In some embodiments, a ML system may allow for the development of an application module for unknown game applications and/or the refinement of application modules for known game applications. For example, while an application module may be provided for a game application with a broad install base, some game applications may have a smaller install base and the creation of a dedicated or predetermined application module may not be desirable. In some embodiments, an existing application module may be refined over time using a ML model to update the application module or other ML model data with new strategies, new movesets, new characters, new stages, new items, or newly popularized techniques and strategies. For example, updates to existing game applications may utilize existing application modules for the UI elements, textures, models, and animations, along with existing key events, popular events, rare events, or combinations thereof while adding new content. The ML model allows the new content to be identified as new UI elements, textures, models, and animations. Upon detecting the new UI elements, textures, models, and animations repeatedly, the ML model may reclassify the detected new UI elements, textures, models, and animations as key events, popular events, rare events, etc. as those elements are detected more frequently and in particular contexts in the video information depicting the game environment.

Generally, systems and methods according to the present disclosure can classify and/or tag portions of the video information based on the presence and/or proximity of the detected and identified elements. In some embodiments, the key events are associated with tags that identify them as key events and associate the key event with any number of contextual tags. For example, an elimination banner in the UI may be detected by the machine vision and/or ML model of the system and identified as a key event. The key event is also assigned tags indicating that the key event is an opponent elimination, was performed with a sniper rifle, was performed while scoped, and was performed at 10 minutes and 31 seconds into the match.

In some embodiments, the tag is associated with a time stamp in the video information timeline. The timeline of the video information may or may not correspond to the match timeline or gameplay session timeline. For example, video information obtained by systems and methods according to the present disclosure may include video information (and, optionally, audio information and/or user inputs) from before, between, or after gameplay sessions. In a particular embodiment, the video information includes video of a streaming electronic game player talking to spectators before a gameplay session begins, a first gameplay session, a lobby between gameplay sessions, a second gameplay session, and video of the streaming electronic game player talking to the spectators after the second gameplay session. In such an example, a key events tagged as occurring in the first 5 minutes of a gameplay session may occur during the first gameplay session, from approximately 7 minutes to 12 minutes on the video information timeline, and during the second gameplay session, from approximately 21 minutes to 26 minutes on the video information timeline. The timestamps for key events tagged as occurring in the first 5 minutes of a gameplay session may be timestamped between 7:00 and 12:00 and between 21:00 and 26:00 relative to the video information timeline.

In some embodiments, timestamping and reporting the identified events to a viewer includes presenting a visual indicator on the video information timeline. In some embodiments, systems and methods according to the present disclosure include amending the metadata of the video information to include tags for events in the video information. In some embodiments, the metadata of the video information file is amended. In some embodiments, the metadata of individual frames of the video information is amended. In some embodiments, a system or method according to the present disclosure creates a separate file with tag information for the video information file.

In some embodiments, a visual indicator may be applied to the video information timeline to visually represent the location of events in the video information. In some embodiments, a dot, line, dash, or other symbol may be presented at the position in the timeline for events meeting selected tags. In at least one example, key events, popular events, and rare events have different symbols associated with each at visual indicators on the timeline. In at least another example, a user may query or select certain tags such as opponent eliminations or round wins, and symbols may be applied to only locations on the video information timeline associated with events with those tags.

In some embodiments, a system for presenting electronic gaming video information to a user includes a client device and a server computer in communication via a data network. In some embodiments, the client device is a computing device with a processor and hardware storage device in communication with the processor. In some embodiments, the hardware storage device is any non-transient computer readable medium that may store instructions thereon. The hardware storage device may be any type of solid-state memory; volatile memory, such as static random access memory (SRAM) or dynamic random access memory (DRAM); or non-volatile memory, such as read-only memory (ROM) including programmable ROM (PROM), erasable PROM (ERPOM) or EEPROM; magnetic storage media, such as magnetic tape; platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory, or any other non-transient storage media. In some embodiments, the hardware storage device is local to and/or integrated with the computing device. In some embodiments, the hardware storage device is accessed by the computing device through a network connection.

The processor may execute a game application that is stored on the hardware storage device to render video information at least partially in response to user inputs to the client device. In some embodiments, the client device includes a display device to display the video information to a playing user. For example, the client device may be a dedicated gaming console with an integrated display (e.g., NINTENDO SWITCH) or a general-purpose computer with an integrated display (e.g., a laptop computer). In some embodiments, the client device is in communication with a display device to display the video information to a playing user. For example, the client device may be a gaming console (e.g., MICROSOFT XBOX) that outputs the video information to a connected display device (e.g., a television) for display to a playing user.

In some embodiments, the video information or a portion of the video information is also transmitted to a server computer via a data network. In some embodiments, the server computer is located remotely from the client device and the data network is or includes the World Wide Web. For example, the client device may be connected to the data network via the playing user's home internet connection, and the server computer may be located in a datacenter. In some embodiments, the server computer is located locally to the client device and the video information is transmitted over a local area network or a direct data connection. For example, a competitive electronic game tournament (e.g., an eSports competition) may have a local network to which all client devices used for the competition are connected. A server connected to the local network may communicate with the client devices used for the competition.

The client device executes a copy of the game application to generate the video information. In some embodiments, the client device renders the video information in real-time. In some embodiments, at least a portion of the video information is pre-rendered. The video information includes information about the game environment and the actions of the playing user. In some embodiments, the video information further includes audio information from the playing user (e.g., commentary or chat), such as during a streaming session. By analyzing and evaluating the video information provided by the client device, the actions of the playing user and interactions of the playing user's avatar or player character in the game environment can be detected, identified, and classified for efficient querying and/or editing. The actions of the playing user and interactions of the playing user's avatar or player character in the game environment may be evaluated and compared against an application module assist in detecting and identifying events in the video information.

In some embodiments, the server computer receives the video information from the client device via the data network. The server computer includes a processor and a hardware storage device in data communication with the processor. The hardware storage device has instructions stored thereon that, when executed by the processor, cause the server computer to perform any of the methods described herein. For example, the server computer may detect events in the video information to classify different events based on identified textures, models, animations, or other criteria.

In at least one embodiment, the server computer includes or is in communication with a machine learning (ML) model that detects and/or reports events in the video information to evaluate the video information and identify and tag events. In some embodiments, the server computer has stored thereon (e.g., in the hardware storage device) a ML model that accesses and/or communicates with ML model data. In some examples, the ML model data is stored locally to the server computer. In some examples, the ML model data is stored remotely from the server computer and accessed by the server computer via the data network. For example, the ML model data may be aggregated from and/or refined by a plurality of ML models executed by a plurality of server computers. The ML model data may be updated based on the outputs of the ML models, with the most current ML model data made available for the ML model running on the server computer when needed.

As illustrated in the foregoing discussion, the present disclosure utilizes a variety of terms to describe features and advantages of the ML model. Additional detail is now provided regarding the meaning of such terms. For example, as used herein, a "ML model" refers to a computer algorithm or model (e.g., a classification model, a regression model, a language model, an object detection model) that can be tuned (e.g., trained) based on training input to approximate unknown functions. For example, a ML model may refer to a neural network or other ML algorithm or architecture that learns and approximates complex functions and generate outputs based on a plurality of inputs provided to the ML model.

In some embodiments, a ML system, model, or neural network described herein is an artificial neural network. In some embodiments, a ML system, model, or neural network described herein is a convolutional neural network. In some embodiments, a ML system, model, or neural network described herein is a recurrent neural network. In at least one embodiment, a ML system, model, or neural network described herein is a Bayes classifier. As used herein, a "ML system" may refer to one or multiple ML models that cooperatively generate one or more outputs based on corresponding inputs. For example, a ML system may refer to any system architecture having multiple discrete machine learning components that consider different kinds of information or inputs.

As used herein, an "instance" refers to an input object that may be provided as an input to a ML system to use in generating an output, such as events within video information. For example, an instance may refer to any virtual object provided in the user interface (UI) of the video information. For example, a UI may present notifications to a user in response to certain events. The ML system may perform one or more machine vision techniques to evaluate the video information for associated events when the UI notification is present. The ML system may refine over iterations to "learn" when visual events are correlated with the UI notification. For example, a UI element indicating player avatar health may increase in value in response to the player avatar interacting with a health pack in the game environment.

In some embodiments, the ML system can create an application module of expected or correlated events in the video information. In a particular example, if the UI element indicates that the playing user has performed an opponent elimination, other aspects of the video information may be detected and/or identified to associate opponent eliminations with the identified animation. In another example, each time a player avatar performs an assist, the ML system may identify to whom the player avatar passed the ball for the goal (such as in sports games including Rocket League or FIFA). Further, the ML system can create or refine an application module to include commonly queried or associated categories of tags for events. In some examples, all key events may be associate with a match timestamp, while opponent eliminations, specifically, further include tags indicating what weapon the player avatar had equipped at that time. In some examples, a player elimination key event may include tags associated with the name of the opponent that eliminated the player and/or the weapon that was used to eliminate the player.

An instance provided to the ML system may further include other digital objects including text, identified objects, or other types of data that may be parsed and/or analyzed using one or more algorithms. In one or more embodiments described herein, an instance is a "training instance," which refers to an instance from a collection of training instances used in training a ML system. Moreover, an "input instance" may refer to any instance used in implementing the machine learning system for its intended purpose. As used herein, a "training dataset" may refer to a collection of training instances. In some embodiments, a training dataset includes a plurality of frames of video information.

In some embodiments, systems and methods described herein obtain a training dataset and identify one or more labels of the instances of the training dataset to detect events based on a comparison of labeled events against an application module. In some embodiments, the application module is predetermined. In some embodiments, the application module is developed and refined by the ML system by iterations of processing video information.

Systems and methods according to the present disclosure parse the video information by detecting objects in frames of the video information. In some embodiments, the objects include virtual objects positioned in the game environment. The video information may reflect the player avatar moving within a three-dimensional or two-dimensional game environment, where the position of the virtual object is associated with a three-dimensional position or two-dimensional position relative to the playing user's perspective in the video information. For example, in a first-person adventure game, the perspective of the playing user represents the player avatar's position within a three-dimensional game environment. The virtual objects in the environment move and scale depending on the movement of the player avatar relative to the overall game environment and/or depending on the movement of the virtual object relative to the game environment.

The machine vision may use one or more image processing techniques to detect objects in the frames of the video information. In some embodiments, the machine vision may use edge detection and/or contrast detection to identify borders of objects or shading on objects. The edge of the virtual object may be detected by evaluating neighboring pixels or kernels of pixels for changes in contrast, color, or resolution. For example, an avatar's face may be lit by in-game light sources more than background objects. The variation in contrast may allow the machine vision to detect the edges of the avatar's face. In some examples, a wooden crate in the game environment may form a substantially straight edge that abruptly transitions from brown pixels to white pixels of the building wall behind the crate. The color transition may allow the machine vision to detect the edges of the crate. Edge detection on a virtual object allows for the determine of the size and shape of the virtual object in the game environment.

In some embodiments, the video information provided by the client device running the game application is associated with game state data. Game state data includes any information that may allow a second electronic device to recreate a given game state. For example, the game state data of a game instance running on a client device may be provided to a second electronic device, which may render a duplicate of the first game instance based on the game state data. In some embodiments, game state data includes virtual object or avatar positions, movement, player character statistics or characteristics, player character inventory, player character status, ability cooldown status, non-player character status, or any other information about the game state.

Because the video information can be associated with the game state data, object identifications (IDs) may be associated with the objects detected in the video information, allowing higher reliability in the object detection. Additionally, the game state data may include object IDs, which can be compared to the detected objects to refine a ML system of the machine vision and improve the object detection of the system.

In some embodiments, machine vision and/or object detection can measure relative motion of edges to determine the position of virtual objects. For example, a detected object that does not change position within the frames across a plurality of frames of the video information while the avatar moves and/or the user's perspective relative to the game environment moves may be an element of the UI. In other examples, a detected object that increases in size differently than the other objects in the game environment may be moving relative to the game environment.

A virtual object, as used herein, may include any object or element rendered or presented by the client device in the process of running the game application. For example, a virtual object may be an element of the UI. In some examples, a virtual object may be a player avatar. In some examples, the virtual object may be wall, floor, or other geometry of the game environment. In some examples, the virtual object may be an interactive or movable object within the game environment, such as a door, crate, or power-up.

In some embodiments, the machine vision and/or ML model can identify objects in the game environment without explicit training to identify the object. For example, a machine vision system that includes ML may learn to identify trees within the game environment, even if the particular model of tree has not been explicitly taught to the machine vision system. In at least one example, systems and methods according to the present disclosure may be portable between video information from a variety of game applications where different models for common objects, such as trees, are used. By training the ML model, the machine vision may be able to recognize and detect tree objects in the video information. In some examples, elements of the game environment are procedurally generated. A series of procedurally generated trees may include common elements but be distinct models from one another, as rendered in the video information. Therefore, an explicitly provided model would be inapplicable to procedurally generated trees.

In some embodiments, the machine vision system invokes an application module that is associated with the game application that is the source of the video information. Art styles can vary considerably between game applications. Even a ML model that has been trained on video information from a plurality of game applications to detect trees may fail when presented with a new art style. For example, while both Fortnite and Call of Duty are competitive first-person shooter games, the appearance of objects is very different between the games. Specifically, trees appear very different between the two game applications.

Systems and methods according to the present disclosure may access an application module that is associated with the game application that is the source of the video information. The application module may be generated by the ML model based on the game engine, may include predetermined or user-defined events, or combinations of both.

As described herein, the ML model data may be stored remotely to the client device and/or the server computer and be accessed by the server computer as needed based on the video information or other information provided by the client device. In at least one embodiment, the ML model data is part of an application module including game application-specific information for machine vision and/or event identification and classification.

In some embodiments, a method of presenting electronic game video information is performed at a server computer. In some embodiments, the method can be performed on any source of video information from a game application, such as gameplay recordings, recreated renderings of a gameplay session based on game state data, or from live streams of the gameplay.

The method includes evaluating at least one frame of the plurality of frames of the video information to identify a virtual object, texture, model, or animation. After identifying the virtual object, texture, model, or animation in the frame, the method includes determining a presence of at least one event associated with the detected element.

The object detection may include any of the methods or techniques described herein to identify the virtual objects in the video information. In some embodiments, the method includes determining the presence of a key event, a popular event, a rare event, or any other type of event based on the present of the object, texture, model, or animation. In some embodiments, determining the presence of an event includes evaluating a change in the virtual object, texture, model, or animation between frames of the plurality of frames. In some embodiments, compared frames are adjacent frames in the native framerate of the rendered game environment. For example, the video information may include 60 frames per second as the client device renders the game environment at 60 frames per second. The compared frames may be adjacent frames in the native 60 frames per second with a delta of approximately 16.67 milliseconds between frames. In some embodiments, the compared frames are key frames or other non-adjacent frames in the native framerate. For example, the video information may include 60 frames per second as the client device renders the game environment at 60 frames per second, but the compared frames are selected 0.25 seconds apart from one another or approximately 15 frames apart.

The changes to the virtual object between the first frame and the second frame may be calculated based on changes relative to the game environment, or changes based on expected correlations. Some changes in the virtual object relative to the game environment may include the appearance or disappearance of the virtual object in the game environment. The comparison of frames may include the detection of a particular animation of an avatar model or other model. A comparison of frames may include the detection of change in textures skinning a model, which may be associated with an event such as receiving damage or acquiring a new piece of equipment in the game.

In some embodiments, the method includes comparing the detected object, texture, model, or animation to one or more events of an application module. As described herein, the application module may be predetermined or may be generated by a ML system. In some embodiments, the application module includes key events, popular events, rare events, any other types of events, or combinations thereof.

In at least one embodiment, key events are events that progress a gameplay session toward a resolution or definitive outcome. In some embodiments, key events may be predetermined in the application module specifically for the game application being played. Key events for an American football game application (such as Madden Football) may include a touchdown, field goal, fumble, fumble recovery, sack, interception, punt, kickoff, halftime, or full time. Key events for a first-person shooter (FPS) game application (such as Fortnite) may include an opponent elimination, a player elimination, a health pickup, a shield pickup, a reload, a multi-elimination, a round victory, a teammate elimination, a flag pickup, or a point capture. Key events for a multiplayer online battle arena (MOBA) game application (such as League of Legends) may include an opponent elimination, a player elimination, a health pickup, a shield pickup, an ability usage, a cooldown expiration, a multi-elimination, a round victory, a teammate elimination, player-versus-environment (PvE) elimination (such as a minion elimination, a tower destruction, or a Dragon elimination in League of Legends); or a player avatar respawn (as the respawn may be delayed from the elimination). The application module can include information regarding key events that may be used to detect and identify commonly referenced events in the course of a gameplay session for later review.

In some embodiments, the application module includes additional event identification based on popular events. For example, some game applications develop a particular set of popular events that viewers and players recognize for skill, strategy, or spectator excitement that may not be considered key events within the course of play. In at least one example, popular events need not advance the game toward a particular outcome, but rather hold a unique interest within a viewership of a game application. For example, in a baseball game application, a batter advancing from home plate to first base progresses the game toward a resolution. In some embodiments, a machine vision and/or ML system according to the present disclosure may detect and identify a difference between a batter advancing by hitting a single, being walked on balls, or being struck by a pitch.

A popular event may be independent of a key event. In some embodiments, shattering a board in a hockey game application has no effect on the outcome of the game, but may hold a unique interests to players and spectators. A popular event may be identified in addition to a key event. In some embodiments, a machine vision and/or ML system may identify a flyout as a key event, while identifying a flyout that is caught by the outfielder jumping above the home run fence as a popular event of unique interest. A popular event may be a combination of key events in sequence or proximity In some embodiments, a super attack in a fighting game is a key event, and a reversal is a key event, but a player reversing a super attack, specifically, is identified as a popular event. In some embodiments, an event that occurs within a particular amount of time (temporal proximity) of another event, such as a series of opponent eliminations, is identified as a popular event.

In some embodiments, the application module includes exploits in the game, such as known bugs, that are allowed in certain areas of competitive electronic gaming. For example, collision bugs between the player avatar and objects in the game environment may be exploited to enable traversal techniques that are otherwise impossible in the game engine. In some communities of speedrunning electronic games, the use of exploits, while not the intended manner of operation of the game engine, are allowed or encouraged. Such exploit events may be considered popular events, as they are not necessary for the completion of the game, but rather are uniquely interesting usages of or interactions with the game environment for a particular demographic of viewership.

In some embodiments, textures, models, animations, or sequences of key events or other occurrences in video information depicting a game environment may not be present or identifiable under an existing application module or event list. Such occurrences may be identified as rare events and surfaced to a viewer of the video information. In some embodiments, rare events include some bugs or exploits that are not intended in the game environment. In some embodiments, rare events include secrets or hidden features that are uncommonly experienced in the game. For example, a hidden character or stage in a game application may require elaborate conditions to be met before a player will activate the character. As such, rare events may be experienced by a limited number of players while remaining of interest to a broader audience.

In some embodiments, the application module includes probability tables that allow the detection of rare events in the video information. For example, drop tables for a role-playing game may control the probability that a game engine provides a particular item to the player avatar in the game environment. If an item has a drop rate of 5.0%, a single detection of the item in the video information is, while uncommon by design, non-anomalous. However, if the method or system described herein detects the item dropping 5 out of 20 chances (a 0.000000147% chance), the sequence may indicate a rare event of interest. In another example, running an identical play in an American football simulation game application multiple times consecutively with the same results may be improbable. While selecting the same play multiple times in a row may not be uncommon or improbable, running the same play with the same result (such as a weak side sweep run play to the sideline that produces 7 yards every play for 11 consecutive plays) may indicate rare event of interest. The application module may include threshold values to determine when a series of probable events becomes sufficiently rare to be designated a rare event. In some embodiments, a probability curve may be calculated based on the drop table or other probability table, and a threshold may be set at a standard deviation away from a most likely outcome. In another embodiment, the threshold may be set manually, such that a detected rare event or sequence of events is reported when the occurrence exceeds the manually set threshold.

While some embodiments of systems and methods for present video information to a user evaluate only video information, some embodiments evaluate other forms of information or data to supplement the video information. In some embodiments, the video information obtained from a client device further includes audio information. Audio information can provide additional data regarding events in the game environment that may not be visible on the video information. In some embodiments, audio cues such as dialog, music, or sound effects may indicate the presence, proximity, or direction of objects or events in the game environment. In some examples, a player avatar may hide from an attack made by a boss character, preventing visual identification of the boss character or the attack, while the audio cue indicates the occurrence of the off-screen attack. In some embodiments, the audio information includes player or chat commentary from the recording of the video information and audio information, allowing identification of discussion or comments about the game environment. In some embodiments, a streaming electronic game player is talking into a microphone while playing the game application, and the audio information includes his or her commentary.

In some embodiments, the video information obtained from the client device includes user input information. A user input, according to the present disclosure, should be understood to include any signal or input by any input mechanism that provides instructions to the client device to interact with and/or affect the game application. The user input information may provide additional context to the detected events in the evaluated frames of the video information. For example, the user input may indicate that a user was attempting to input a super attack command in a fighting game, which was anticipated and reversed, producing an example of a combined key event, popular event, and a rare event.

The method further includes receiving a query from a user for the presence of the event in the video information. In some embodiments, the video information is evaluated, and a plurality of events are indexed in the video information metadata or in a separate timestamp file prior to receiving the query from a user. In some embodiments, the query prompts the evaluation of the video information for the related event.

In some embodiments, at least one event is identified in the video information, and the presence of the at least one event is denoted to associate the event with at least one frame of the video information. In some embodiments, denoting the presence of the event includes amending the metadata of the video information file with a timestamp to temporal location of the frame. For example, the metadata of the video information file may include a timestamp with tags to identify the type of event and any additional tags with additional information or event subtypes. The metadata of the video information file may be readable by a video editing software or video viewing software to visualize the timestamps of the events as locations on a timeline of the video information. In some embodiments, the metadata is searchable to search the list of timestamps for the particular tags or for any tags that are within a given value, such as timestamps between 5:00 and 8:00 in the match timeline.

In some embodiments, denoting the presence of the event includes amending the metadata of an individual frame of the video information file with tags. For example, the metadata of individual frames of the video information file may include tags to identify the type of event and any additional tags with additional information or event subtypes. Amending the metadata of individual frames may inherently associate the tags with a position on a timeline of the video information, as each frame has a temporal location in the video information. The metadata of the individual frames of the video information file may be readable by a video editing software or video viewing software to visualize the timestamps of the events as locations on a timeline of the video information. In some embodiments, the metadata is searchable to search for the particular tags or for any tags that are within a given value.

In some embodiments, denoting the presence of the event includes creating or amending a separate file with a list of timestamps or other mechanism to associate the contents of the separate file with the timeline of the video information. For example, the contents of the separate file may include a timestamp with tags to identify the type of event and any additional tags with additional information or event subtypes. The contents of the separate file may be readable by a video editing software or video viewing software in conjunction with the video information file to visualize the timestamps of the events as locations on a timeline of the video information. In some embodiments, the content of the separate file is searchable to search the list of timestamps for the particular tags or for any tags that are within a given value.

In some embodiments, at least one tag used to identify an event in the video information is associated with a single frame of the plurality of frames in the video information. In some embodiments, a tag is associated with a single frame to mark the frame at which an elimination occurs or the frame at which the match ends. In some embodiments, a tag is associated with a single frame to mark the beginning of an identified animation.

In some embodiments, at least one tag used to identify an event in the video information is associated with a plurality of sequential frames to represent a duration of the event in the video information. In some embodiments, a tag is associated with frames occurring from 5:15 to 5:32 in the video information to denote the duration of an active power-up. In some embodiments, a tag is associated with a duration during which opponents eliminations occur, which all contribute to the event of a multi-elimination banner is identified in the UI at the end of the duration. In a particular example, five opponent eliminations occur during an eight second duration between 5:20 and 5:28 in the video information. In some embodiments, each of the five opponent eliminations are identified as key events, with each key event being denoted as such. At 5:30, a UI banner indicating a Team Elimination is identified and denoted as a key event and a popular event. In response to identifying the Team Elimination at 5:30, the system may look back in the video information to identify the range from 5:20 to 5:30, during which the five opponent eliminations that contribute to the Team Elimination and the UI banner announcing Team Elimination all occur, may be further denoted as a popular event. The result is a queryable set of tags that allow a user to search for the timestamp for each opponent elimination, the timestamp for the Team Elimination UI banner, or for a video clip that contains the complete eight second event that produced the Team Elimination.

In some embodiments, a plurality of identified events within a preset temporal proximity to one another may be recorded or reported to the user as an event amplitude. For example, a particular point in the video information or a portion of the video information with a high density of events may indicate a particularly climatic moment or sequence in the video information. The high density of events may be of particular interest to a viewer or editor.

The method, in some embodiments, further includes presenting to the user a visual representation of the at least one frame of the plurality of frames of the video information associated with the at least one event. In some embodiments, the visual representation or visual indicator is a dot, dash, shape, or symbol presented on a UI of the video information editing or viewing software. In some embodiments, the shape or symbol representing the event on the video information timeline may be unique to the type of event or tags associated with the event. For example, a dot may indicate a key event, a heart may indicate a popular event, and a diamond may indicate a rare event. In some examples, different key events may have different symbols or visual representations associate with the key events, such as an "X" symbol indicating a player elimination key event, a crosshair indicating an opponent elimination event, a cross indicating a healing key event, a checkered flag indicating a round end, etc.

In some embodiments, the visual representation is a table of contents or chapter list that allows a user to link to the associated temporal location in the video information. In some embodiments, each event in the list of timestamps has a symbol, text tag, or other visual representation associated with the event to present to the user easily differentiated and recognizable links to the events in the video information. In at least one embodiment, one or more events are automatically selected and surfaced to the user as high priority events. For example, a plurality of events in close temporal proximity may produce an event amplitude above a preset threshold and prompt the video information editing or video information viewing software to present the high amplitude series of events to the user. In other examples, the video information editing or video information viewing software may present to the user any popular events or rare events.

In some embodiments, a method of presenting video information from an electronic game is performed at the client device or at a recording device local to the client device, which may subsequently be used to upload the video information and/or event information to a data network. While the embodiment of a method will be described in relation to a discrete recording device in data communication with the client device, it should be understood that some embodiments may be performed on the client device, itself. In at least one example, the client device is retail commodity hardware game console, and substantially all computational resources of the processor(s) are dedicated to the execution of the game application stored on the client device. As such, a recording device in communication with the client device may allow for additional computational resources local to the client device without compromising game performance A recording device, in some embodiments, includes a hardware storage device in communication with at least one processor. The client device provides video information (and, optionally, user input data and/or game state data) to the recording device. In some embodiments, the recording device is connected to a data network to communicate with or access a remote server computer and/or ML model data.

The recording device receives the video information from the client device and evaluates the video information for events according to an application module. In some embodiments, the recording device evaluates the video information according to any of the methods described herein.

In some embodiments, the recording device or client device obtains video information produced by execution of a game application on the client device. In some embodiments, the video information is obtained by the client device upon rendering the video information. In some embodiments, the video information is obtained by the recording device by a local data connection to the client device. The method further includes evaluating at least a first frame of the video information to determine at least one event in the video information.

A virtual object, texture, model, or animation may be detected by any of the methods or techniques described herein. For example, detecting the virtual object, texture, model, or animation and determining the presence of at least one event in the video information may include any of the machine vision and/or ML techniques described herein. In some embodiments, the method further includes comparing the detected virtual object, texture, model, or animation to one or more events of an application module.

In some embodiments, the application module is created by a machine learning system through training datasets. For example, a machine learning system may evaluate many events to determine correlations between events across many video streams or recordings. In some embodiments, the application module is a predetermined ruleset based on the game engine of the game application to inform the system of various events, such as key events, popular events, rare events, or any other types of events.

In some embodiments, the method 668 optionally further includes generating one or more clips of the video information based on the identified events and/or the tags associated with the identified events. For example, the clip may include the frame in which an event is first identified, any subsequent consecutive frames in which the event is identified (e.g., the full duration of the event) and a predetermined number of frames or period of time before the first frame of the event and/or a predetermined number of frames or period of time after the final frame of the event. For example, if the event is five seconds in duration, the clip may include the three seconds immediately prior to the event, the five seconds of the event, and three seconds immediately after the event. The clip may be presented to the user as a selectable portion of a timeline, such as in the UI described in relation to FIG. 4 or the clip may be presented to the user as a standalone video file. The user may subsequently save, export, or share the clip via a network, such as via social media.

The social media metrics of the clip shared to social media (e.g., "likes", shares, comments, views, saves, or other social media engagement metrics may be reported to the ML model and/or ML model data to further refine ML model based on other user's reactions to the events with the associated tags. For example, a clip published to social media showing an elimination performed at very low resource levels in League of Legends may spur greater social engagement than a single elimination performed with high resource levels. The ML model may, therefore, refine and train over time to identify and/or highlight events which are correlated to high levels of social engagement on social media.

In some embodiments, a plurality of clips may be presented to the user as a standalone video file that includes a plurality of events from the video information.

In some embodiments, the video file may be automatically generated based on the identified events and tags. In some embodiments, the video file may be automatically generated based on one or more queries received from the user or preset in the system. For example, the method may include evaluating the video information to identify any events including sniper rifle eliminations (such as described in the example described above), and the video file may be an automatically generated compilation of all sniper rifle eliminations identified in the video information. In some embodiments, the user may preset one or more parameters to automatically generate a "highlight reel" video file upon the evaluation of a video information. In at least one embodiment, the user may preset one or more parameters to automatically generate a "highlight reel" video file upon the termination of a live video stream. An electronic game streamer, therefor, is able to play the electronic game, broadcast the content in real-time during the gameplay, and, upon completion of the gameplay session and termination of the real-time video stream, have the system automatically create a highlight video file of the streaming session for the user to post online.

Systems and methods according to the present disclosure provide an automated and intelligent evaluation and categorization of video information for electronic games through analysis of the video information. The systems and methods provide efficient categorization and visualization for editors and viewers, as editing raw video information and creating video content for distribution can require many multiples of hours as the original raw video information. Analysis of the video information by the machine vision and ML systems described herein allow a first filter on video information review and classification that can save time and energy, making electronic game players and editors more efficient with their time.

The present disclosure relates to systems and methods for presenting visual information from an electronic game according to at least the examples provided in the sections below:

[A1] In some embodiments, a method of presenting video information to a user includes, at a server computer (e.g., 104 of FIG. 1), obtaining video information including a plurality of frames from an electronic game (e.g., 330 of FIG. 3) and obtaining ML model data (e.g., 118 of FIG. 1) including an application module including game characteristics (e.g., 672 of FIG. 6). The method includes determining a presence of at least one event in the video information (e.g., 332 of FIG. 3) using a ML model and the ML model data to identify the at least one event and at least one game characteristic (i.e., UI element 226 in FIG. 2; player avatar 220 of FIG. 2; object 424 of FIG. 4) present during the event. Upon receiving a query from a user for the presence of the at least one event and at least one game characteristic present during the event in the video information (e.g., 334 of FIG. 3), the method includes denoting a presence of the at least one event in the video information associated with at least one frame of the plurality of frames of the video information (e.g., 336 of FIG. 3) and presenting to the user a visual representation (e.g., visual representation 444 of FIG. 4) of the at least one frame of the plurality of frames of the video information associated with the at least one event (e.g., 336 of FIG. 3).

[A2] In some embodiments, the method described in [A1] further includes amending the metadata of the video information after identifying the at least one event.

[A3] In some embodiments, the at least one game characteristic described in [A1] or [A2] includes a sound.

[A4] In some embodiments, the method described in any of [A1]-[A3] further includes presenting to the user a visual representation includes marking on a timeline (e.g., 442 of FIG. 4) of the video information the location of the at least one frame in the timeline.

[A5] In some embodiments, the query described in any of [A1]-[A4] includes a plurality of parameters.

[A6] In some embodiments, the ML model (e.g., 118 of FIG. 1) described in any of [A1]-[A5] is an unsupervised model.

[A7] In some embodiments, the ML model (e.g., 118 of FIG. 1) described in any of [A1]-[A6] is trained by video information from other users.

[A8] In some embodiments, the ML model (e.g., 118 of FIG. 1) described in any of [A1]-[A7] is trained by social media metrics of published video information.

[A9] In some embodiments, the video information in any of [A1]-[A8] is obtained from a client device (e.g., 102 of FIG. 1) that renders the video information.

[A10] In some embodiments, the method described in any of [A1]-[A9] further includes automatically presenting to the user a visual representation of at least three events identified by the server computer.

[A11] In some embodiments, the at least one event of in any of [A1]-[A10] includes a presence of an object (e.g., object 424 in FIG. 4) in the video information.

[A12] In some embodiments, the at least one event of in any of [A1]-[A11] occurs over at least two frames in the video information.

[A13] In some embodiments, the visual representation described in any of [A1]-[A14] includes an amplitude indicator.

[B1] In some embodiments, a method of presenting video information to a user includes, at a client device (e.g., 102 of FIG. 1), obtaining video information including a plurality of frames from an electronic game (e.g., 670 of FIG. 6) and obtaining ML model data (e.g., 118 of FIG. 1) from a remote server (e.g., 672 of FIG. 6). The method includes determining a presence of at least one event in the video information using the ML model data to identify the at least one event (e.g., 674 of FIG. 6). Upon receiving a query from a user for the presence of the at least on event in the video information (e.g., 676 of FIG. 6), the method includes denoting a presence of the at least one event in the video information associated with at least one frame of the plurality of frames of the video information (e.g., 678 of FIG. 6) and presenting to the user a visual representation of the at least one frame of the plurality of frames of the video information associated with the at least one event (e.g., 680 of FIG. 6).

[B2] In some embodiments, the method of [B1] further comprises rendering the video information at the client device (e.g., 102 of FIG. 1).

[B3] In some embodiments, the method of [B1] or [B2] further includes transmitting to a remote server (e.g., 104 of FIG. 1) information regarding the at least one event in the video information.

[B4] In some embodiments, denoting the presence of the at least one event as described in any of [B1]-[B3] includes associating a timestamp list with the video information wherein each event of the plurality of events is denoted with a timestamp in the timestamp list.

[B5] In some embodiments, the timestamp list of [B4] is a separate data file from the video information.

In another aspect, some implementations include a system having memory and one or more processors. The system is configured perform any of the methods described herein, e.g., any of methods A1-A15 and B1-B5.

In yet another aspect, some implementations of the technology described herein include a computer-readable storage medium for storing computer-readable instructions. The computer-readable instructions, when executed by one or more hardware processors, perform any of the methods described herein, e.g., any of methods A1-A15 and B1-B5.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of presenting video information to a user, the method comprising:
   at a server computer:
      obtaining video information including a plurality of frames from an electronic game;
      obtaining machine learning (ML) model data including an application module including game characteristics associated with the electronic game;
      determining a presence of at least one event in the video information using a ML model and the ML model data to identify the at least one event and at least one game characteristic present during the at least one event;
      receiving a query from a user for the presence of the at least one event and the game characteristic present during the at least one event in the video information;
      denoting a presence of the at least one event in the video information associated with at least one frame of the plurality of frames of the video information; and
      presenting to the user a visual representation of the at least one frame of the plurality of frames of the video information associated with the at least one event.

2. The method of claim 1 further comprising amending metadata of the video information after determining the presence of the at least one event.

3. The method of claim 1, wherein presenting to the user a visual representation includes marking on a timeline of the video information the temporal location of the at least one frame.

4. The method of claim 1 further wherein the game characteristic includes a sound.

5. The method of claim 1, wherein the query includes a plurality of parameters.

6. The method of claim 1, wherein the ML model is an unsupervised model.

7. The method of claim 1, wherein the ML model is trained by video information from other users.

8. The method of claim 1, wherein the ML model is trained by social media metric of published video information.

9. The method of claim 1, wherein the video information is obtained from a client device that renders the video information.

10. The method of claim 1, further comprising presenting to the user a visual representation of at least three events automatically identified by the server computer.

11. The method of claim 1, wherein the at least one event includes a presence of an object in the video information.

12. The method of claim 1, wherein the at least one event occurs over at least two frames in the video information.

13. The method of claim 1, wherein the visual representation of the at least one frame of the plurality of frames of the video information associated with the at least one event includes an amplitude indicator.

14. A method of presenting video information to a user, the method comprising:
   at a client computer:
      obtaining video information including a plurality of frames from an electronic game;
      obtaining ML model data from a remote server;
      determining a presence of at least one event in the video information using the ML model data;
      receiving a query for the presence of the at least one event in the video information;
      denoting a presence of the at least one event in the video information associated with at least one frame of the plurality of frames of the video information; and
      presenting to the user a visual representation of the at least one frame of the plurality of frames of the video information associated with the at least one event.

15. The method of claim 14 further comprising rendering the video information.

16. The method of claim 15, further comprising transmitting to the remote server information regarding the at least one event in the video information.

17. The method of claim 14, wherein determining a presence of at least one event includes indexing the plurality of frames and determining a plurality of events.

18. The method of claim 17, wherein denoting the presence of the at least one event includes associating a timestamp list with the video information wherein each event of the plurality of events is denoted with a timestamp in the timestamp list.

19. The method of claim 18, wherein the timestamp list is a separate data file from the video information.

20. A method of presenting video information to a user, the method comprising:
   at a server computer:
      obtaining video information including a plurality of frames;
      determining a presence of at least one event in the video information;
      receiving a query for the presence of the at least one event in the video information;
      denoting a presence of the at least one event in the video information associated with at least one frame of the plurality of frames of the video information; and
      presenting to the user a visual representation of the at least one frame of the plurality of frames of the video information associated with the at least one event.

* * * * *